United States Patent
Kim et al.

(10) Patent No.: US 8,457,106 B2
(45) Date of Patent: Jun. 4, 2013

(54) METHOD FOR WIRELESS COMMUNICATION IN WIRELESS SENSOR NETWORK ENVIRONMENT

(75) Inventors: Jungsook Kim, Daejeon (KR); Jae Han Lim, Daejeon (KR); Kyeong Tae Kim, Chuncheon-si (KR); Byung Tae Jang, Daejeon (KR); Jeong Dan Choi, Daejeon (KR); Do Hyun Kim, Daejeon (KR); Jaejun Yoo, Daejeon (KR); Kyung Bok Sung, Daejeon (KR); Jeong Ah Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 858 days.

(21) Appl. No.: 12/569,439

(22) Filed: Sep. 29, 2009

(65) Prior Publication Data

US 2010/0083035 A1   Apr. 1, 2010

(30) Foreign Application Priority Data

Sep. 30, 2008 (KR) .................. 10-2008-0096031
May 12, 2009 (KR) .................. 10-2009-0041378

(51) Int. Cl.
*H04L 12/28* (2006.01)
*H04L 12/56* (2006.01)
*H04L 12/43* (2006.01)

(52) U.S. Cl.
USPC ........ 370/351; 370/389; 370/395.4; 370/400; 370/458

(58) Field of Classification Search
None
See application file for complete search history.

(56) References Cited

U.S. PATENT DOCUMENTS

| 7,075,890 | B2 | 7/2006 | Ozer et al. |
| 7,769,848 | B2 | 8/2010 | Choy et al. |
| 7,929,988 | B2 * | 4/2011 | Horiuchi et al. ........... 455/550.1 |
| 8,014,285 | B2 * | 9/2011 | Yoon et al. ..................... 370/235 |
| 8,111,619 | B2 * | 2/2012 | Liu et al. ...................... 370/229 |
| 2003/0152041 | A1 * | 8/2003 | Herrmann et al. ............ 370/310 |
| 2007/0101015 | A1 | 5/2007 | Larsson et al. |
| 2007/0153716 | A1 * | 7/2007 | Fukuzawa et al. ........... 370/315 |
| 2008/0107034 | A1 | 5/2008 | Jetcheva et al. |
| 2008/0181101 | A1 | 7/2008 | Oh et al. |
| 2008/0212504 | A1 * | 9/2008 | Venkataraman et al. ..... 370/310 |

(Continued)

FOREIGN PATENT DOCUMENTS

| KR | 10-2006-0076418 | 7/2006 |
| KR | 10-2007-0048469 | 5/2007 |

(Continued)

OTHER PUBLICATIONS

TTAK.KO-06-0194 (TTA Standard), "Specification of Telematics Sensor Networks for Providing Driving Environment Information," Dec. 19, 2008.

(Continued)

*Primary Examiner* — Chirag Shah
*Assistant Examiner* — Ashley Shivers
(74) *Attorney, Agent, or Firm* — Staas & Halsey LLP

(57) ABSTRACT

Provided is a wireless communication method in a wireless sensor network environment. The method overhears a packet transmitted from a source sensor node to a destination sink node and determines whether the destination sink node receives the packet. A transmission node selected by using local information among a plurality of neighboring sensor nodes transmits the overheard packet to the destination sink node when the packet is not received.

7 Claims, 5 Drawing Sheets

U.S. PATENT DOCUMENTS

| | | | |
|---|---|---|---|
| 2009/0109885 A1* | 4/2009 | Fonseca et al. | 370/311 |
| 2010/0061350 A1* | 3/2010 | Flammer, III | 370/338 |
| 2010/0220653 A1* | 9/2010 | Hwang et al. | 370/328 |
| 2011/0002251 A1* | 1/2011 | Shin et al. | 370/311 |

FOREIGN PATENT DOCUMENTS

| | | |
|---|---|---|
| KR | 10-2007-0056225 | 6/2007 |
| KR | 10-2007-0064326 | 6/2007 |
| KR | 10-2008-0071668 | 8/2008 |

OTHER PUBLICATIONS

TTAK-KO-06-0195 (TTA Standard), "Specification of Telematics Sensor Network MAC for Providing Driving Environment Information", Dec. 19, 2008.

* cited by examiner

METHOD FOR WIRELESS COMMUNICATION IN WIRELESS SENSOR NETWORK ENVIRONMENT

CROSS-REFERENCE TO RELATED APPLICATION

This application claims priority to and the benefit of Korean Patent Application No. 10-2008-0096031 and 10-2009-0041378 filed in the Korean Intellectual Property Office on Sep. 30, 2008 and May 12, 2009, the entire contents of which are incorporated herein by reference.

BACKGROUND OF THE INVENTION (a) Field of the Invention

The present invention relates to an apparatus for transmitting a packet within a delay time against a failure in transmitting the packet, which may occur due to an obstacle in a wireless sensor network installed on a road by using a wireless communication method in the wireless sensor network environment, and a method thereof.

(b) Description of the Related Art

Nodes constituting a sensor network installed on a road need to perform communication while adapting themselves to a rapidly changing channel environment in communication between the nodes. When an obstacle such as a vehicle, etc., is present between a transmission node and a reception node, a communication success ratio between the two nodes drops to a very low level. Therefore, it is impossible to predict the communication success ratio between the transmission and reception nodes at the time when the transmission node transmits a packet.

In the related art, proactive routing technologies such as a destination sequenced distance vector (DSDV), a wireless routing protocol (WRP), a clusterhead gateway switch routing (CGSR), etc., maintain the latest path information by periodically distributing a routing table to a terminal including path information to a destination. However, the proactive routing scheme has a large maintenance cost of a routing table and must periodically transmit the path information to the terminal regardless of the necessity of the path information.

Meanwhile, a reactive routing technology such an ad hoc on-demand distance vector routing (AODV), dynamic source routing (DSR), etc., finds a path by flooding a route request (RREQ) packet as necessary. This technology requires a long delay time for an initial path discovering time and has a problem in excessive flooding.

As such, the proactive routing and the reactive routing has a common point in previously determining a follow-up hop node on a path after previously determining a path to a destination before transmitting all packets. However, the proactive routing and the reactive routing are not suitable for a wireless sensor network system in a road environment in which it is actually impossible to predict the communication success ratio between the transmission and reception nodes at the time when the transmission node transmits the packet.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for transmitting a packet from a transmission sensor node to a target sink node within a predetermined delay time with high reliability even when a communication success ratio between the transmission sensor node installed on a road and a reception sink node installed at a roadside varies unpredictably.

An exemplary embodiment of the present invention provides a wireless communication method in a wireless sensor network environment that includes: overhearing a packet transmitted from a source sensor node to a destination sink node; determining whether the destination sink node receives the packet; and allowing a transmission node selected by using local information among a plurality of neighboring sensor nodes to transmit the overheard packet to the destination sink node when the packet is not received.

Another embodiment of the present invention provides a wireless communication method in a wireless sensor network environment that includes: determining whether or not an answer packet is received from a destination sink node; checking whether a transmission candidate node selected from a plurality of neighboring sensor nodes that overhear the packet transmits the packet to the destination sink node when the answer packet is not received; and overhearing the packet when the transmission node transmits the packet to the destination sink node instead of the source sensor node.

DETAILED DESCRIPTION OF THE EMBODIMENTS

Figure 1:
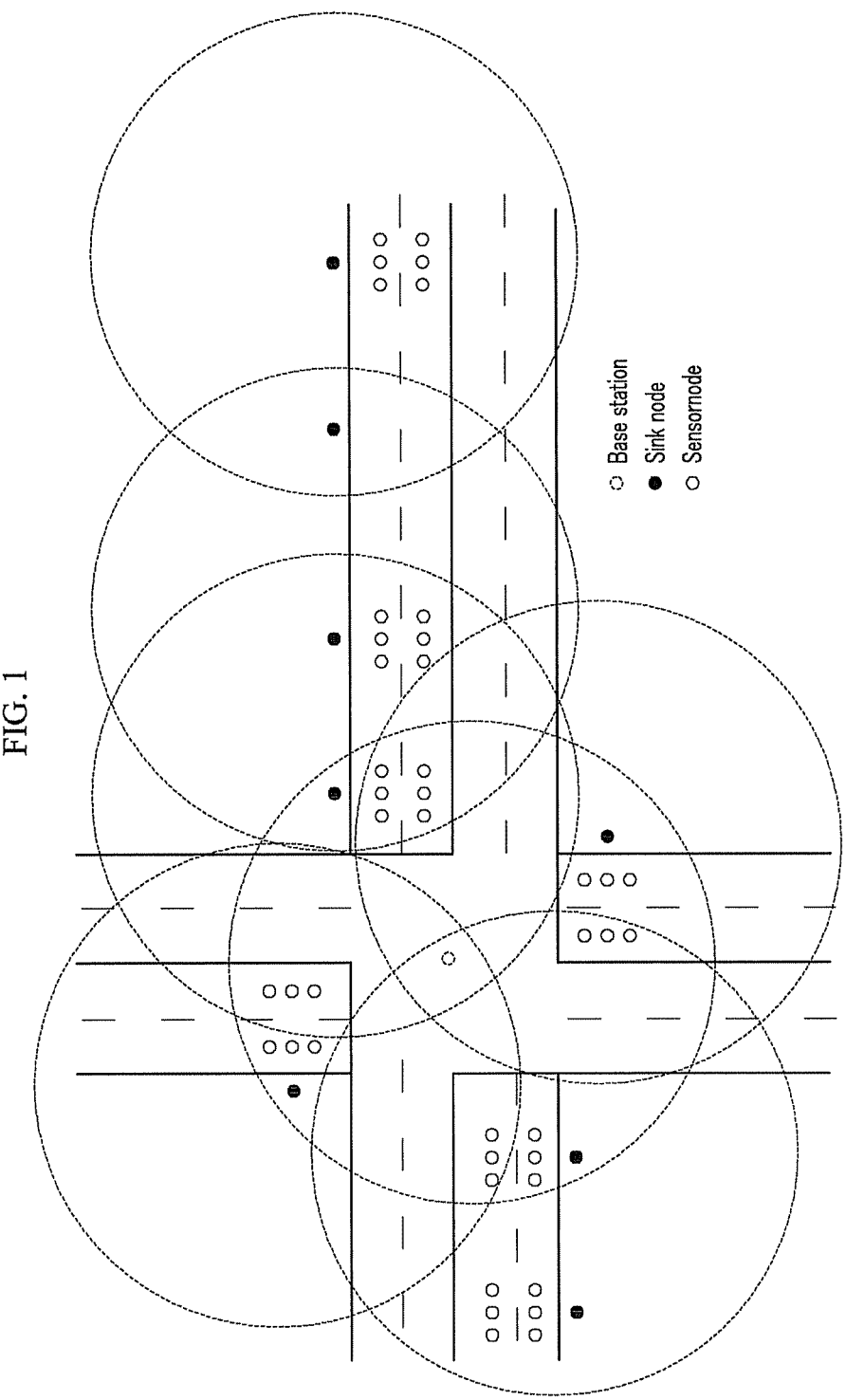
FIG. 1 is a structural diagram of a wireless communication network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Hereinafter, a wireless communication network and a wireless communication method according to an exemplary embodiment of the present invention will be described with reference to the accompanying drawings.

FIG. 1 is a structural diagram of a wireless communication network according to an exemplary embodiment of the present invention.

As shown in FIG. 1, the communication network according to an exemplary embodiment of the present invention has a cluster tree structure. A route of an entire network serves as a base station, and a header of each cluster serves as a sink node. The sink node installed at a roadside includes a plurality of sensor nodes, and other sink nodes adjacent to the corresponding sink node as child nodes.

For successful communication with high reliability within a given time period, communication collision should be avoided. Contention-based communication methods do not guarantee highly reliable communication within a given time period. Thus, a communication method, particularly, a time division multiple access (TDMA)-based media access control (MAC) communication method while performing reliability-based real-time sensor network MAC communication using a superframe, has been proposed.

In the case of performing wireless communication by the time division multiple access (TDMA) method, it is possible to transmit the packet from the source sensor node to the destination sink node with high reliability within a predetermined delay time when no obstacle is present. For this, a communication system for communication by the TDMA method selects a node having packet transmission authority in each time-divided time slot by time-dividing a media, and broadcasts schedule information including time slot transmission authority information to an entire network. At this time, each divided time domain is referred to as a time slot. However, the proposed communication method causes the following problem when it is applied to roads.

Sensor nodes that are buried in the center of a traffic lane can successfully transmit a packet to a sink node at a roadside when no obstacle is provided between the sensor node and the sink node. However, when an obstacle such as a vehicle is provided between the sensor node and the sink node, a packet transmission probability sharply decreases. Vehicles always exist in the road and it is difficult to estimate a location of a vehicle and time. Particularly, since a vehicle existing between the sensor node and the sink node causes sudden decrease of communication success rate, an existing TDMA-based communication method cannot offer real-time and reliable communication for telematics services.

In order to solve such a problem, the present invention proposes a method for successfully transmitting packets to a destination sink node from a source sensor node within a given time period through neighboring sensor nodes of the source sensor node.

Figure 2:
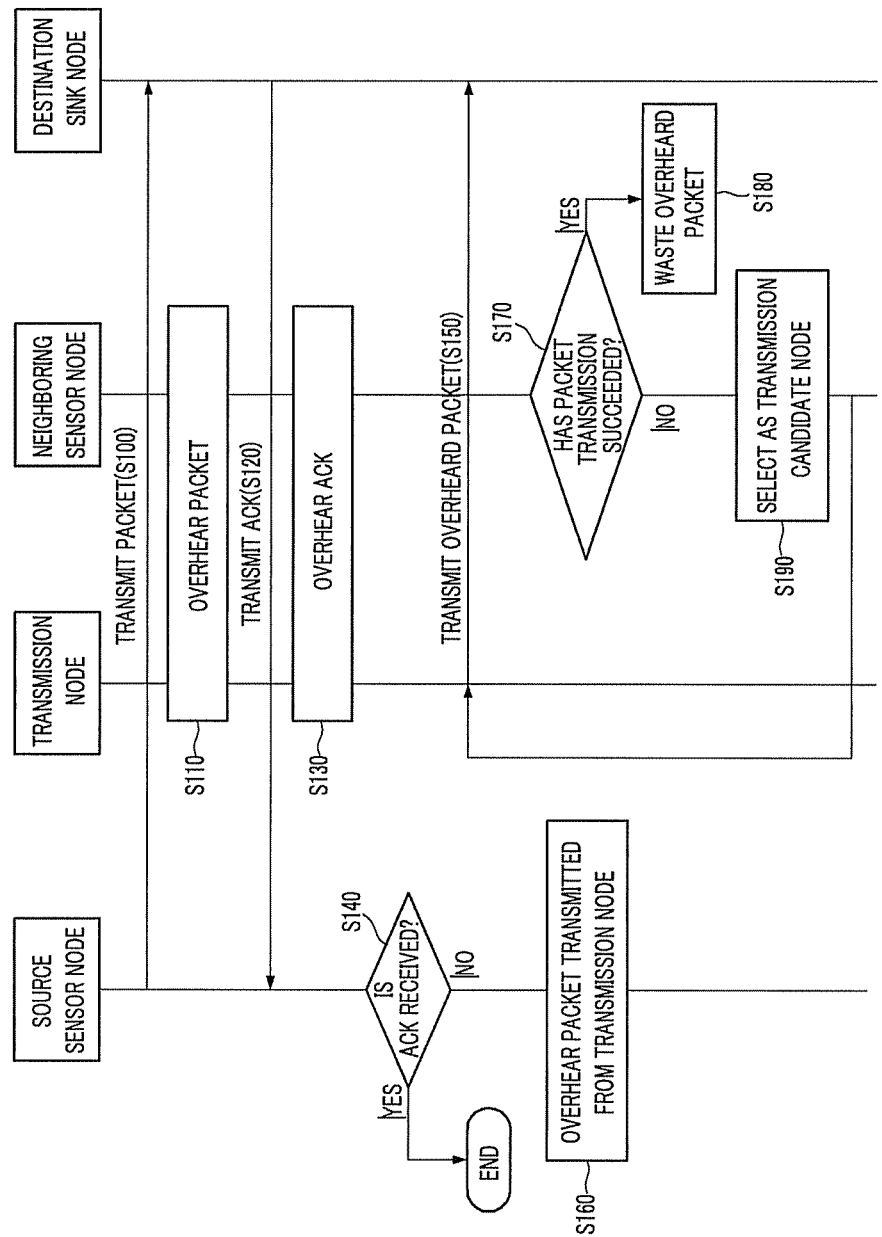
FIG. 2 is a flowchart of a wireless communication method according to an exemplary embodiment of the present invention.

FIG. 2 is a flowchart of a wireless communication method according to an exemplary embodiment of the present invention.

As shown in FIG. 2, when the source sensor node tries to transmit the packet to the destination sink node (S100), a neighboring sensor node of the source sensor node overhears the packet that the source sensor node tries to transmit to the destination sink node (S110). The destination sink node that receives the packet from the source sensor node transmits an answer packet (ACK) (S120). At the same time, the neighboring sensor node of the source sensor node also overhears the answer packet from the destination sink node (S140).

The source sensor node determines whether or not to receive the answer packet from the destination sink node (S150) and determines that the packet transmitted in step S100 is successfully transmitted when receiving the answer packet. In addition, neighboring sensor nodes that overhear both the packet transmitted by the source sensor node and the packet transmitted by the destination sink node determine that the source sensor node successfully transmits the packet to the destination sensor node.

Meanwhile, when the destination sink node fails in receiving the packet and does not transmit the answer packet although the source sensor node transmits the packet, the source sensor node determines that the packet transmission has failed. Further, neighboring sensor nodes that overhear the packet from the source sensor node and don't overhear the answer packet that the destination sink node transmits to the source sensor node determine that the packet transmission from the source sensor node has failed.

When the neighboring sensor nodes determine that the packet transmission from the source sensor node has failed, a predetermined neighboring sensor node is selected among the neighboring sensor nodes that overhear the transmission-failed packet to transmit the transmission-failed packet to the destination sink node instead of the source sensor node. At this time, the neighboring sensor node that transmits the transmission-failed packet to the destination sink node instead of the source sensor node is referred to as a transmission node, and the neighboring sensor nodes that overhear the transmission-failed packet are referred to as transmission candidate nodes.

The source sensor node overhears that the transmission node transmits the packet to the destination sink node (S160) and determines that the packet is transmitted to the destination sink node when the source sensor node succeeds in overhearing the transmission of the packet by the transmission node. Meanwhile, when another transmission packet is present in addition to the overheard transmission packet, the transmission node may transmit two packets that are integrated.

The transmission candidate node is limited to some nodes among neighboring sensor nodes of the source sensor node to minimize consumption of energy of the neighboring sensor nodes. The sensor node selected as the transmission candidate node must overhear the packet that the source sensor node transmits to the destination sink node and the answer packet that the destination sink node transmits to the source sensor node by activating a receiver while the source sensor node transmits the packet to the destination sink node. The receiver is switched to an energy saving state by deactivating the receiver to thereby minimize energy consumption.

Herein, the transmission candidate node is a neighboring sensor node that is closer to the destination sink node than the source sensor node among the neighboring sensor node of the source sensor node. The transmission candidate node that is a neighboring sensor node to which a time slot is allocated has later than a time slot allocated to the source sensor node.

The time slot allocation will now be described in further detail with reference to FIG. 3 and FIG. 4.

Figure 3:
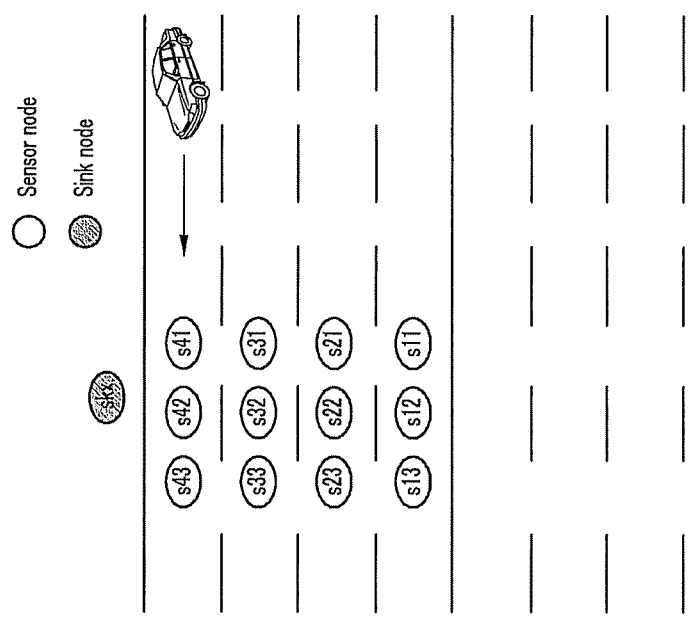
FIG. 3 exemplarily shows a relationship between a sink node and a sensor node according to the exemplary embodiment of the present invention.
Figure 4:
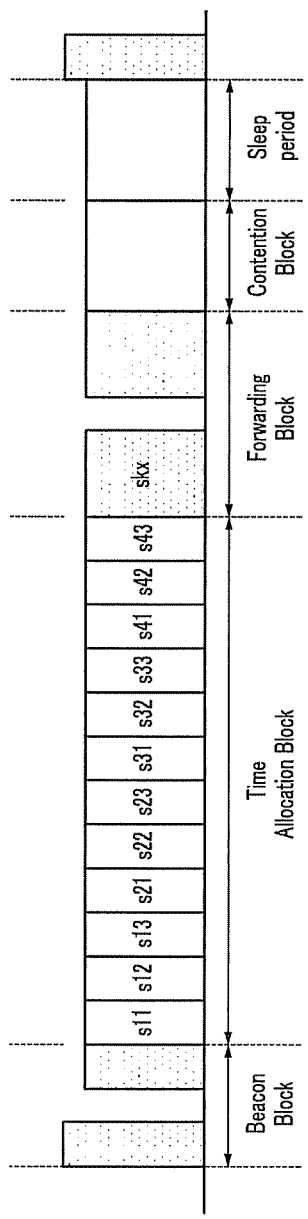
FIG. 4 exemplarily shows time slot allocation information according to the exemplary embodiment of the present invention.

FIG. 3 exemplarily shows a relationship between the sink node and the sensor node according to the exemplary embodiment of the present invention, and FIG. 4 exemplarily shows time slot allocation information according to the exemplarily embodiment of the present invention.

Time slot allocation of the sensor node and the sink node of FIG. 3 is as shown in FIG. 4.

A sensor node S11 is allocated with the first slot in a time allocation block for data transmission and a sensor node S43 is allocated with the last slot in the time allocation block. When a sensor node S22 transmits data in the fifth slot of the time allocation block allocated to the sensor node S22 in a network of FIG. 3 having time slot allocation schedule information of FIG. 4, S23, S31, S32, and S33 may be transmission candidate nodes based on a location and time slot allocation information of the sensor node S22.

The schedule information of each time slot is generally broadcasted to an entire network that is included in beacon information. Nodes that receive a beacon can know network schedule information. In the structural diagram shown in FIG. 1, the sink nodes that are cluster headers broadcast schedule information that is included in the beacon information on their own child nodes, and sensor nodes that belong to the same cluster as the sink nodes can know schedule information of neighboring sensor nodes through the information included in the beacon. That is, in the case of performing the TDMA method, the corresponding sensor node can know the schedule information of the neighboring sensor nodes in addition to the schedule information of the corresponding sensor node.

Meanwhile, when the transmission candidate nodes perform the communication by the TDMA method, the transmission candidates do not activate their receivers during an entire time slot interval allocated to the source sensor node, but activate their receivers only during a guard time for correcting a time synchronization error of the time slot allocated to the source sensor node and a time for receiving a preamble. By this configuration, it is possible to minimize the energy consumption.

Meanwhile, some of transmission candidate nodes selected on the basis of a distance between the source sensor node and the destination sink node and information on the allocated time slot are selected as final transmission candidate nodes. This is to finally select the transmission candidate node by selecting some of the transmission candidate nodes as the final transmission candidate nodes on the basis of one or more of information of transmission/reception buffer lengths and vehicle occupancy information of nodes selected from the transmission candidate nodes before the source sensor node transmits the packet.

That is, first, the transmission candidate nodes are selected on the basis of the distance between the source sensor node and the destination sink node and the allocated time slot information. Thereafter, since a vehicle occupies some transmission candidate nodes of the firstly selected transmission candidate nodes just before the source sensor node transmits the packet, a probability to overhear the packet from the source sensor node decreases even though the receiver is activated. At this time, the transmission candidate nodes occupied by the vehicle are finally excluded from the transmission candidate nodes. That is, in FIG. 3, when the sensor node S22 transmits the data to a sink node SKx, the S23, S31, S32, and S33 may be the transmission candidate nodes based on the location and time slot information of the sensor node S22. However, when a vehicle exists on the sensor node S31, transmission candidate nodes including vehicle occupancy information is determined to S23, S32, and S33, and only S23, S32, and S33 activate their receivers in a time slot of S22 to overhear data transmission from S22.

In this case, when a data buffer length is added and a transmitting/receiving buffer of S32 exceeds a predetermined length so that data transmission/receiving cannot be performed within the corresponding beacon interval, the transmission candidate node is limited to S23 and S33.

By this configuration, power consumption required to overhear the packet at the time when the source sensor node transmits the packet can be minimized by deactivating a transceiver. Further, when data length of the transmission/reception buffers of some transmission candidate nodes of the firstly selected transmission candidate nodes is larger than a predetermined threshold value, the corresponding transmission candidate node is excluded from the final transmission candidate node.

When the source sensor node fails in transmitting the packet, one transmission candidate node of the transmission candidate nodes must be selected as the transmission node. The transmission node is individually selected by using only local information of each transmission candidate node.

Each transmission candidate node determines whether or not to substitutively transmit the overheard packet on the basis of information such as, whether or not each transmission candidate node is occupied by a wheel of the vehicle on the transmission time, its communication buffer queue length, the location of the allocated time slot, etc.

The time slot allocated to the transmission node has later than the time slot allocated to the source sensor node when the transmission node performs the communication by the TDMA method. The transmission node is the fastest transmission candidate node among the transmission candidate nodes. The transmission node is a transmission candidate node on which the wheel of the vehicle is not positioned at the time of transmitting the packet. A time point at which a transmission candidate node overhears a packet from the source sensor node and a time point at which the transmission candidate node is selected as a transmission node and transmits the overheard packet are different from each other. The transmission candidate node overhears a packet from the source sensor node in a time slot allocated to the source sensor node and transmits the overheard packet to a time slot allocated to the transmission candidate node as necessary.

In addition, the transmission candidate node that can transmit the overheard packet is selected as the transmission node by checking its communication buffer queue length.

The selected transmission node substitutively transmits the transmission-failed packet to the destination sink node (S150). Neighboring sensor nodes of the selected transmission node determine whether or not the packet is successfully transmitted by overhearing the packet of the transmission node (S170). The neighboring sensor nodes of the selected transmission node include the source sensor node that fails in transmitting the packet.

When the selected transmission node succeeds in substitutively transmitting the transmission-failed packet to the destination sink node and receives an answer packet thereto from the destination sink node, the neighboring sensor nodes of the transmission node including the source sensor node substitutively overhear the transmission packet and the answer packet. The source sensor node that substitutively overhears the transmission packet and the answer packet determines that the selected transmission node succeeds in transmitting the packet to the destination sink node instead of the source sensor node and wastes the transmission-failed packet (S180). Other transmission candidate nodes of the source sensor node determine that the transmission node that firstly transmits the packet instead of the source sensor node succeeds in transmitting the packet to the destination sink node and waste the overheard packet from the source sensor node.

In the embodiment of the present invention, the first-priority transmission node is a transmission candidate node that has later time slot than the source sensor node's time slot and faster time slot than other Transmission candidate nodes. Further, the second-priority transmission node is a transmission candidate node that is allocated with a time slot having later than the time slot allocated to the first-priority transmission node and faster time slot than the others.

In the case when the wheel of the vehicle occupies the sensor node or it cannot transmit the transmission-failed packet of the source sensor node to the destination sink node instead of the source sensor node due to an excessively large communication buffer queue length at the time when a first-priority transmission node among the transmission candidate nodes transmits the packet, other transmission candidate nodes recognize that the first-priority transmission node does not substitutively transmit the transmission-failed packet of the source sensor node by overhearing the packet transmission of the first-priority transmission node. Therefore, a second-priority transmission node substitutively transmits the transmission-failed packet of the source sensor node.

When a transmission node transmits an overheard packet to a destination sink node rather than to a source sensor node, the transmission node may transmit data to transmit, together with the overheard packet. Packet aggregation is performed in a MAC layer and a data frame format for distinguishing aggregated packets is as shown in FIG. 5

Figure 5:
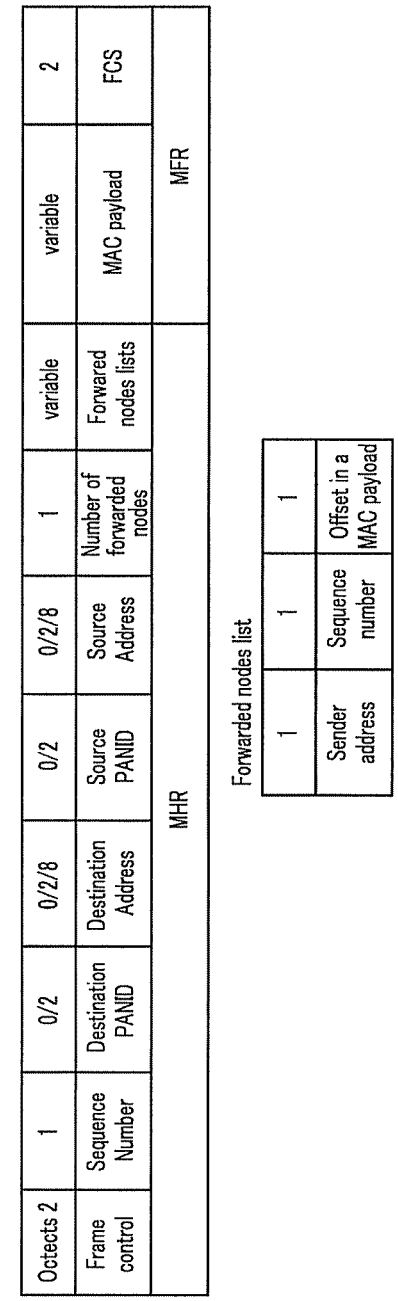
FIG. 5 shows a data frame format according to the exemplary embodiment of the present invention.

FIG. 5 shows a data frame format according to the exemplary embodiment of the present invention.

As shown in FIG. 5, a MAC header includes the Number of forwarded nodes and Forwarded nodes lists for distinguishing aggregated packets in addition to frame control, a sequence number, Destination PANID, Destination Address, Source PANID, and a Source Address. The number of forwarded nodes indicates the number of aggregated nodes by the transmission node in the MAC layer, and the forwarded nodes lists, each being 3-bite sized and thus the size of a total forwarded nodes lists is the number of forwarded nodes*3 bites. Each of the forwarded nodes list is formed of a Sender address, a sequence number, an offset in a MAC payload. The Sender address is a MAC address of a source transmission node of the aggregated packet, the sequence number is a sequence number of the aggregated packet, and the offset in a MAC payload is a location of the first bite of a MAC service data unit (MSDU) of the aggregated packet in a MAC payload of the present packet.

A MAC of the destination sink node sorts packets aggregated by a transmission node from a MAC level to an upper layer by using the Number of forwarded nodes and forwarded nodes lists of a received packet.

In the case when no transmission candidate node transmits the transmission-failed packet to the destination sink node instead of the source sensor node, the source sensor node may retransmit the transmission-failed packet during a follow-up beacon interval. In the case of selecting the transmission candidate node by such a method, network overhead for selecting the transmission candidate node does not occur and a packet transmission success ratio can be increased even in an unpredictable channel status on a road by selecting the transmission node at the time of transmitting the packet, rather than in a method in which the transmission node is previously selected at the time of receiving the packet.

Meanwhile, the destination sink node transmits to the sensor nodes a group answer packet which is a bitmap-type answer packet for sensor nodes within the same cluster at the time of receiving the packet. This has an advantage in repeatedly transmitting the answer packet within the same beacon interval. Therefore, a reception probability of the answer packet increases and repeated transmission of the same packet can effectively be prevented.

In the embodiment of the present invention, it is assumed that are provided eight sensor nodes having addresses of the child sensor nodes of the destination sink node which are aa11, aa22, . . . , aa88, respectively. In this case, the destination sink node transmits a group answer packet set as shown in Table 1 at the time of receiving a packet generated from the child sensor node aa11.

TABLE 1

| 1 | 0 | 0 | 0 | 0 | 0 | 0 | 0 |

Thereafter, the destination sink node transmits a group answer packet set as shown in Table 2 at the time of receiving a packet generated from the child sensor node a33 within the same beacon interval.

TABLE 2

| 1 | 0 | 1 | 0 | 0 | 0 | 0 | 0 |

In the case when the sensor node from the transmission node succeeds in substitutively transmitting the packet to the destination sink node, transmission candidate nodes that are not selected as the transmission node must waste the overheard packet. That is, if the transmission candidate nodes overhear that one node of the transmission candidate nodes substitutively transmits the transmission-failed packet to the destination sink node at the time when the source sensor node fails in transmitting the packet, the transmission candidate nodes determine that the transmission candidate node that substitutively transmits the packet is the transmission node. The transmission candidate nodes that are not selected as the transmission node waste the overheard packet.

By such a method, only one transmission candidate node is selected as the transmission node, which firstly transmits the transmission-failed packet instead of the source sensor node among the numerous transmission candidate nodes. Therefore, other transmission candidate nodes that are not selected as the transmission node waste the transmission-failed packet by overhearing the packet of the transmission node, thereby reducing network congestion and resource consumption which are caused due to repeated transmission of the packet.

Meanwhile, the transmission node becomes the source sensor node at the time of substitutively transmitting the packet instead of the source sensor node, and an algorithm for increasing a packet transmission success ratio through overhearing from the source sensor node to the destination sink node operates. Meanwhile, the source sensor node that receives the answer packet from the destination sink node broadcasts a repetition-preventing packet just after the answer packet in order to prevent repeated transmission of the packet in the case when the neighboring transmission candidate nodes of the source sensor node cannot receive the answer packet.

According to an embodiment of the present invention, it is possible to detect a packet transmission failure that may occur due to an obstacle such as a vehicle in a wireless sensor network that is installed on a road, and transmit the packet from a transmission node to a reception node within a predetermined delay time with high reliability by using a communication apparatus and a communication method that can increase a real-time packet transmission success ratio in a road environment.

Therefore, even in an environment in which a physical communication success ratio between transmission and reception nodes variably changes due to a vehicle of a sensor node installed on a road and other obstacles, if a little additional network overhead is generated, sensor data can be stably transmitted.

The embodiments of the present invention are implemented through not only the apparatus and method, but may also be implemented through a program that realizes functions corresponding to constituent members of the exemplary embodiments of the present invention or a recording medium in which the program is recorded. The implementation will be easily implemented by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wireless communication method, comprising:
   selecting a plurality of transmission candidate nodes among a plurality of neighboring sensor nodes of a source sensor node through at least one of time slot information, location information, transmitting/receiving buffer length information, or vehicle occupancy information;
   the plurality of selected transmission candidate nodes being activated in a time slot allocated to the source sensor node and overhearing a packet transmitted from the source sensor node to a destination sink node;
   determining whether the destination sink node receives the packet by overhearing whether an answer packet that informs whether the destination sink node received the packet is transmitted to the source sensor node;
   when it is determined that the destination sink node did not receive the packet, selecting one of the plurality of transmission candidate nodes as a transmission node by using at least one of the time slot information, the transmitting/receiving buffer length information, and the vehicle occupancy information; and
   checking whether the selected transmission node transmits the overheard packet to the destination sink node,
   wherein the selecting the transmission candidate nodes comprises checking a distance between the source sensor node and the destination sink node by using location information of the source sensor node and selecting a node to which a time slot is allocated has later than a time slot allocated to the source sensor node as the transmission node among the plurality of neighboring sensor nodes.

2. The wireless communication method of claim 1, wherein the selecting the transmission candidate nodes further comprises, immediately before the source sensor node transmits the packet, finally selecting a part of the transmission candidate nodes as a final transmission candidate node based on at least one of transmitting/receiving buffer length information or vehicle occupancy information of nodes selected as the transmission candidate nodes.

3. The wireless communication method of claim 1, wherein the selecting the transmission node comprises, at a time point that is determined to be a time point for packet transmission of the transmission candidate nodes, prioritizing the plurality of transmission candidate nodes based on one of the time slot information, the transmitting/receiving buffer length information, and the vehicle occupancy information, and
   selecting the transmission node in order of priority from a node having the highest priority among the plurality of transmission candidate nodes.

4. The wireless communication method of claim 1, the transmission node that overhears the packet from the source sensor node activates a receiver only during a guard time for correcting a time synchronization error of the time slot allocated to the source sensor node and a time for receiving a preamble.

5. The wireless communication method of claim 1, wherein, when the transmission node has data to transmit, the transmission node generates forward node list information by aggregating data overheard from the source sensor node and the data to transmit, includes the generated forward node list in a MAC header of a packet, and transmits the packet to the destination sink node.

6. A wireless communication method, comprising:
   transmitting a packet to a destination sink node;
   determining whether or not an answer packet is received from the destination sink node;
   checking whether a transmission candidate node, selected from a plurality of neighboring sensor nodes that overhear the packet, transmits the packet to the destination sink node when the answer packet is not received; and
   overhearing the packet when the transmission candidate node transmits the packet to the destination sink node instead of a source sensor node,
   wherein the transmission candidate node is selected among the plurality of neighboring sensor nodes of the source sensor node through at least one of time slot information, location information, transmitting/receiving buffer length information, or vehicle occupancy information, and
   wherein the selecting the transmission candidate node comprises checking a distance between the source sensor node and the destination sink node by using location information of the source sensor node and selecting a node to which a time slot is allocated has later than a time slot allocated to the source sensor node as the transmission candidate node among the plurality of neighboring sensor nodes.

7. The wireless communication method of claim 6, wherein
   the answer packet is a group answer packet that is transmitted to a plurality of sensor nodes within the same cluster.

* * * * *